Dec. 30, 1930.  J. W. SMITH  1,787,092

POWER EQUALIZING DEVICE FOR VEHICLE BRAKES

Original Filed Sept. 26, 1922

INVENTOR.
JOHN W. SMITH.
BY John P. Barber
ATTORNEY.

Patented Dec. 30, 1930

1,787,092

UNITED STATES PATENT OFFICE

JOHN W. SMITH, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

POWER-EQUALIZING DEVICE FOR VEHICLE BRAKES

Original application filed September 26, 1922, Serial No. 590,565. Divided and this application filed June 27, 1928. Serial No. 288,575.

This application is a division of my pending application for Letters Patent Serial No. 590,565, filed September 26, 1922.

This invention relates to automotive vehicles and more particularly to the type embodying braking mechanisms for the front or steering wheels in addition to the usual braking mechanism associated with the rear or traction wheels.

The object of the invention is to provide means for simultaneously applying power to the braking mechanisms at the front and rear ends of the vehicle and to equalize the power so distributed whereby each braking mechanism may be actuated to the same degree with respect to the other braking mechanisms.

This and other objects are accomplished by what I now regard as the preferred form of my invention from among other possible arrangements embraced within the spirit of the invention and the scope of the appended claims.

In the accompanying drawings.

Figure 1:
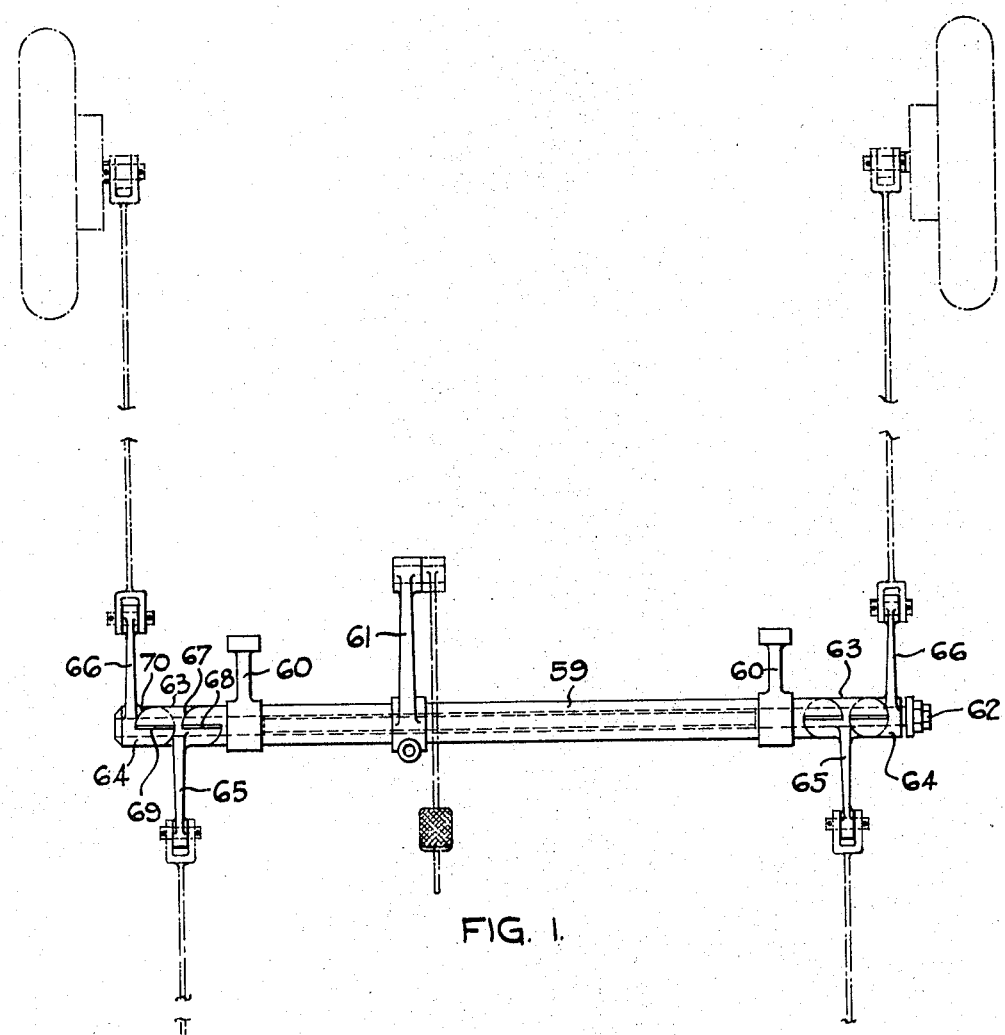
Fig. 1 is a view in elevation of the equalizing device for dividing the braking effort among several braking devices, the wheels and braking connection being diagrammatically shown.
Figure 2:
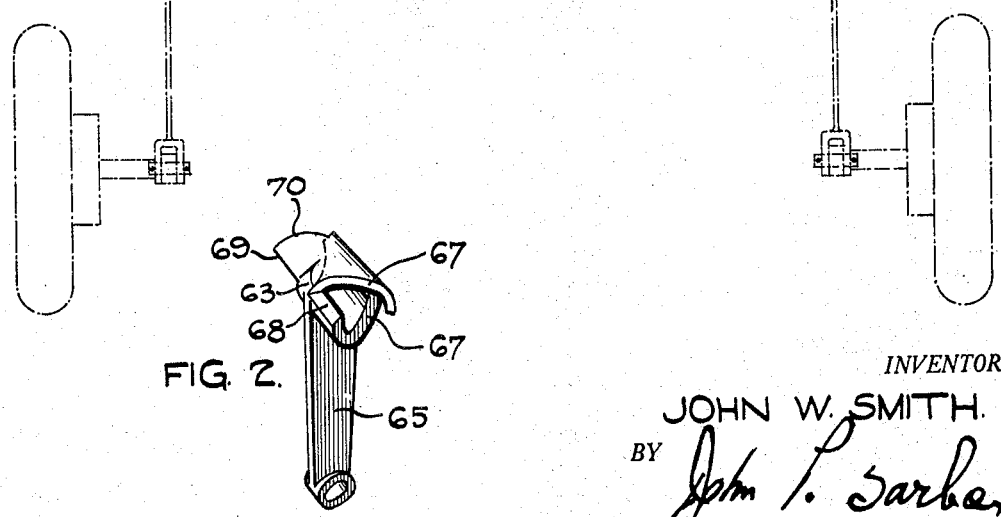
Fig. 2 is a view in perspective of one of the arms forming a part of the equalizing device and illustrating the equalizing clutch members.

In the successful operation of four wheel brakes it is necessary to divide or equalize the braking effort between the four braking mechanisms. This has been heretofore accomplished by means of differentiating devices of a more or less complex and inefficient nature. I have devised an extremely simple and effective mechanism whereby this purpose may be accomplished and refer to Figures 1 and 2 wherein 59 designates a tubular shaft adapted to be extended transversely of the vehicles, located preferably at a medial point and supported by means of brackets 60 for rotation. The tubular shaft 59 is rotated by means of an arm 61 affixed thereto and adapted for linkage connection to the brake pedal.

A rod 62 extends throughout the length of the tubular shaft 59 and beyond the ends supports a pair of sleeves 63 and a pair of sleeves 64, the former being interposed between the latter and the ends of said tubular shaft. The sleeves 63 are each provided with a radial arm 65 for linkage connection to one of the braking mechanisms of the front wheels, while the sleeves 64 are each provided with an arm 66 adapted for linkage connection with the braking mechanism of the rear or traction wheels of the vehicle. The adjacent or contacting ends of the tubular shaft 59 and the sleeves 63 are formed with complementary spiral or equalizing clutch faces 67 and axial faces 68, the spiral faces 67 permitting limited movement between the said parts in one direction by gradually causing binding engagement therebetween so as to eventually completely limit such movement. In a similar manner the adjacent ends of the sleeves 63 and 64 are formed with axial faces 69 and spiral cooperating faces 70 arranged with respect to the spiral faces 67 so that binding action of the sleeves 64 will occur upon rotation thereof relative to the tubular shaft 59 in a direction opposite to that of the sleeve 63. One end of the rod 62 is headed and the other end threaded to receive a nut enabling the relative spacing of the sleeves 63, 64, and the amount of lost motion to be varied by adjusting said nut.

In the operation of this device it will be noted that when the brakes are applied, effecting rotation of the tubular shaft 59, during initial rotative movement of the latter the spiral faces 67 at the ends of the shaft 59 will be gradually tightened against the contacting spiral faces of the sleeves 63 until the latter are carried therewith, and upon motion of the sleeves 63 the sleeves 64 will likewise be successively tightened in the same manner and carried therewith so that a distribution of binding strains will take place between the spiral faces 67 and 70 at each end of the device and eventually the power transmitted to the braking devices to an equal and uniform degree. In this operation it will be noted that the tubular shaft 59 is a rotary actuating element, and that the successively actuated sleeves of each of the pairs 63 and 64 each constitute a series of actuating elements, each series actuating the front and rear brakes of the vehicle on the same side thereof. Such successive operation of the elements of the series, one by the other, is carried out through the mutual engagement of the elements of the series. While the equalizing of the front and rear brakes on each side is carried out by the mutual engagement of the elements of the pairs 63 and 64 on opposite sides of the vehicle, the equalizing action as between the brakes on opposite sides of the vehicle is carried out by the engagement between the shaft 59 and the innermost elements of the respective series.

The simplicity of my invention and its lack of basic character do not, by any means, preclude modifications. It is believed that the prior art admits of very considerable breadth of interpretation of the annexed claims within the generic spirit of the invention.

What I claim is:

1. A power equalizing device comprising a plurality of relatively movable elements and means for effecting a gradual binding engagement between the several elements upon the movement of one element relative to the others, together with front and rear vehicle brakes operated respectively from the said elements.

2. A power equalizing device comprising an actuated element, a series of actuating elements, and means for progressively locking the actuated element to said actuating elements in binding engagement and to effect a distribution of binding strain equally between said elements, together with front and rear vehicle brakes operated respectively from the actuating elements of said series.

3. A power equalizing device comprising a rotating element and a plurality of operating elements connected in series for successive operation one by the other, and means for effecting a gradual binding engagement between the rotative element and said operating elements and to distribute uniformly binding strain therebetween.

4. A power equalizing device comprising a shaft, a series of aligned elements for cooperative engagement with the shaft, and means to effect a gradual binding engagement between the shaft and elements, whereby to cause an even distribution of power from the shaft to said elements, together with front and rear vehicle brakes operated respectively from the elements of said series.

5. A power equalizing device comprising a shaft, and a series of elements aligned with the shaft and in mutual engagement, said elements and the shaft ends having cooperating complementary spirally arranged surfaces, whereby to cause progressive binding engagement between the shaft and elements and between the elements to effect uniform distribution of power to the latter.

6. A power equalizing device comprising a tubular shaft having its ends formed with spiral clutch faces, a pair of aligned sleeves, one at each end of the shaft having complementary clutch faces, for cooperation with the shaft clutch faces, a second pair of aligned sleeves the latter and the first sleeves having similar cooperating and complementary spiral clutch faces, whereby rotation of the shaft is imparted to the sleeves by virtue of binding engagement between the spiral faces, and a rod running through the shaft and sleeves to tie them together with means to vary the amount of play between the shaft and sleeves.

7. A power equalizing device comprising a shaft, and a series of elements aligned with the shaft and in mutual engagement, said elements and the shaft ends having cooperating complementary spirally arranged surfaces, whereby to cause progressive binding engagement between the shaft and elements and between the elements to effect uniform distribution of power to the latter, together with front and rear vehicle brakes operated respectively from the elements of said series.

8. A power equalizing system for vehicle brakes comprising two series of actuated elements, a common actuating element, means for progressively locking the actuating element to both of said series of actuated elements in binding engagement to effect a distribution of binding strain equally between the elements of said series, and two pairs of vehicle brakes, one pair of said vehicle brakes being connected to one of said actuated elements and the other to the other actuated element.

In testimony whereof I hereunto affix my signature.

JOHN W. SMITH.